Feb. 1, 1966  B. VAN BREEMEN  3,232,198
CURTAIN SHUTTER
Filed April 23, 1963  2 Sheets-Sheet 1

INVENTOR.
BERTRAM VAN BREEMEN
BY *Charles J. Ungemach*
ATTORNEY

Feb. 1, 1966  B. VAN BREEMEN  3,232,198
CURTAIN SHUTTER
Filed April 23, 1963  2 Sheets-Sheet 2

INVENTOR.
BERTRAM VAN BREEMEN
BY Charles B. Ungemach
ATTORNEY

United States Patent Office 3,232,198
Patented Feb. 1, 1966

3,232,198
CURTAIN SHUTTER
Bertram Van Breemen, Glendora, Calif., assignor to Honeywell Inc., a corporation of Delaware
Filed Apr. 23, 1963, Ser. No. 275,006
3 Claims. (Cl. 95—57)

The present invention relates to photography and more particularly to a focal plane shutter mechanism for use in cameras in which simplicity of structure, ease of operation and maintenance, and speed are desired.

Focal plane shutters have long been characterized by their high speed of operation and as such are frequently preferred over between-the-lens shutters. Furthermore, since focal plane shutters are mounted separately from the lens system ease of removal of the lens system is facilitated providing for ease of maintenance. Prior focal plane shutters usually comprise a curtain of opaque material having a slot therethrough which is caused to move between the lens system and the film and to expose the film during the transit. A second curtain or alternate shutter is frequently provided which is drawn between the lens and the film after a picture has been taken so that the slotted curtain may be rewound back across the film to its initial position without causing further exposure. The additional mechanism necessary to move the front curtain increases the complexity, weight and cost of the apparatus, which is generally undesirable. With the present invention, the use of an additional curtain and its associated apparatus is eliminated.

Prior art focal plane shutters are normally actuated by a spring mechanism which must be rewound after each picture. This is usually accomplished by pulling the slotted curtain back to its initial position and while this in itself is not particularly undesirable, the time required to rewind the shutter prevents taking of pictures in rapid succession. In the present invention several pictures may be taken in rapid succession without rewinding of the spring drive mechanism.

Previous focal plane shutters have necessarily required the slot to pass in front of the entire film during one transit since mechanism necessary to stop the motion of the curtain half way through a transit would be unduly complex and burdensome. In some cases, it is desirable to expose only a portion of the film during each transit and the present invention provides structure which may easily accomplish this desired end without additional apparatus.

Briefly, the present invention comprises an endless belt of opaque material through which a large and a small aperture are provided on substantially opposite sides of the belt. The belt is caused to travel in such a manner that the large and small apertures pass each other going in opposite directions once each half cycle to thus expose the film which is placed beneath the belt. The belt normally always moves in one direction so that no rewinding of the drive mechanism is necessary for at least several pictures depending upon the size of the spring employed. By adjusting the size of the larger aperture, varying amounts of film may be exposed during a single transit and since no rewinding is necessary, no additional blocking curtain need be utilized.

A more complete understanding of the present invention will be obtained upon the reading of the following specification, claims and drawings in which:

Figure 1:
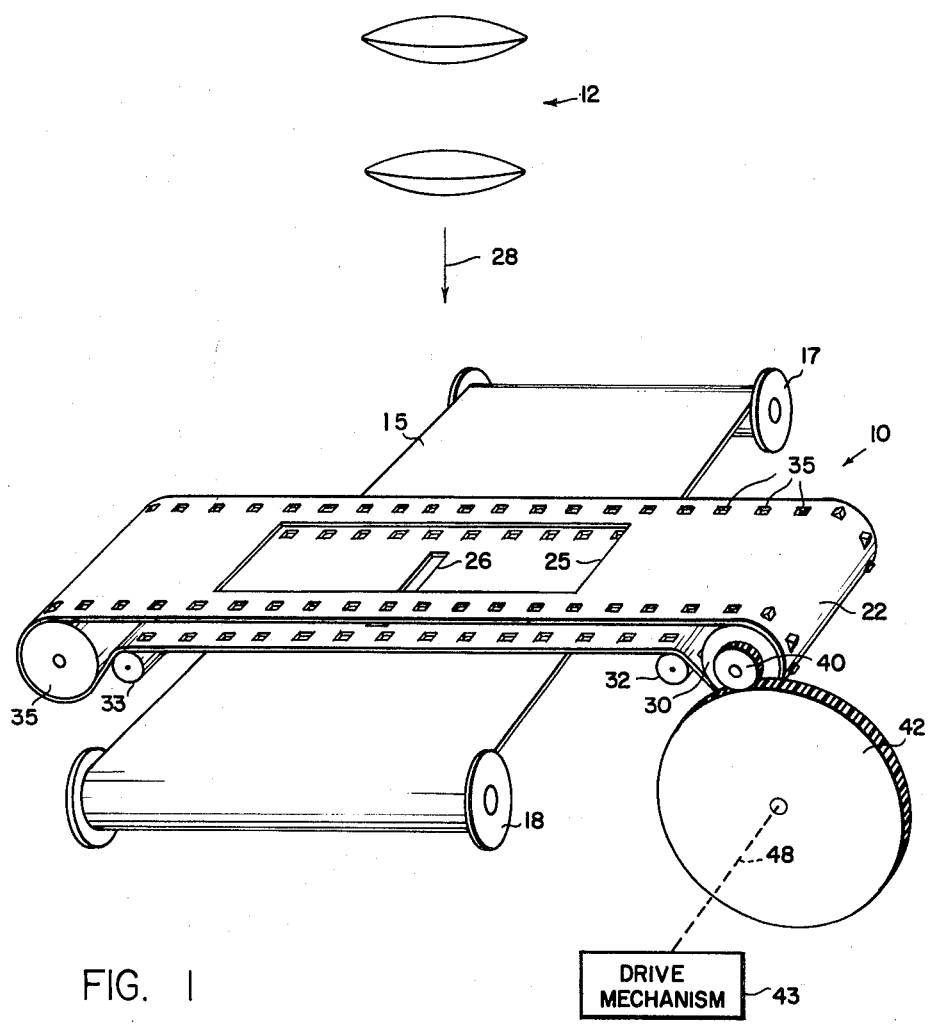
FIGURE 1 is an isometric view of the apparatus of the present invention.

Referring now to FIGURE 1, a shutter mechanism 10 is shown mounted between a lens system 12 and a film 15. The lens system may be of the sort generally used in focal plane shutter type cameras and the film may be of any convenient type. These elements are mounted in a camera (not shown) in any conventional and convenient way and these elements form no part of the present invention. The film is shown as winding and unwinding from rollers 17 and 18 in a conventional manner though any film plate or other type of film handling mechanism may be employed.

The shutter mechanism 10 comprises a lop or endless belt 22 of opaque material which has at least two light transmitting portions shown in FIGURE 1 as apertures 25 and 26. Aperture 25 is relatively large while aperture 26 is relatively small and corresponds to the slot of a normal focal plane shutter curtain. Light being transmitted from the lens system 12 shown by arrow 28 will reach film 15 only if aperture 26 is within the field of aperture 25. The endless belt 22 is shown mounted on a system of rollers which comprise a drive roller 30, spacing rollers 32 and 33 and idler roller 35. The belt is placed about the outer peripheries of drive roller 30 and idler roller 35 and over the top portions of spacer rollers 32 and 33 so that in the area between rollers 32 and 33 the upper and lower portions of belt 22 are relatively flat and adjacent. It is seen that as the belt 22 is caused to move, the upper portion of the belt will move in a direction opposite to the lower portion so that aperture 26 will transmit or pass aperture 25 twice during a complete cycle. The first time they pass aperture 26 will lie underneath aperture 25 while the second time aperture 26 will be on top and aperture 25 beneath it. The belt may be described as moving in a circuitous path wherein the apertures will pass or transit so as to expose the film once during each half circuit. In FIGURE 1, the flat portion of the belt is shown approximately midway of the folded length with the film 15 directly below. The apertures are placed substantially diametrically opposite each other on the belt so that they transit within the flat portion above the film. With such an arrangement the transit will occur twice in one complete circuit of the belt. In some cases it may be desirable to have only one exposure of the film for a complete cycle of the belt. In such a case the film would be mounted more towards one end of the folded belt than the other and the apertures would be moved closed together in one direction on the belt. Then although the apertures would pass twice each cycle of the belt the transits would occur at different places on the folded length of belt. By properly choosing the distance between apertures one of the transits may be made to occur above the film and the other remote from the film so that only one exposure for a complete cycle of the belt would occur. With this latter arrangement of apertures two separate films could also be employed one adjacent each of the areas where the apertures cross so as to take successive pictures on separate films. It is thus seen that many alternate arrangement of the belt and film can be employed with this invention and the preferred embodiment of FIGURE 1 is for purposes of explanation rather than limitation. After a transit is complete at least one layer of opaque material will lie between the lens system 12 and the film 15 to prevent further exposure of the film. For the next successive picture the belt will be caused to move in the same direction as it moved originally and the relative position of the apertures will be reversed but it is seen that no rewinding of the mechanism is necessary after each picture and that no additional curtain need be employed. By varying the size of the large aperture 25 various amounts of the film may be exposed during a single transit as will be explained with regard to FIGURES 2 and 3 and varying the size of aperture 26 allows various amounts of exposure.

The drive wheel 30 may have a friction engagement with the belt 22 or as shown in FIGURE 1, a more conventional sprocket drive mechanism. For this purpose, drive holes such as 35 are shown along the edges of belt 22.

For purposes of driving belt 22 approximately one-half circuit for each picture, any convenient drive mechanism may be employed. As shown in FIGURE 1, a gear 40 is attached to drive roller 30 and cooperates with a drive gear 42. Drive gear 42 in turn may be connected to any convenient drive mechanism 43 by a connection shown as dash line 48. The drive mechanism 43 may be for example a spring biased motor which upon operation of a release mechanism rotates a predetermined amount and stops. By proper gearing between the shaft and the drive wheel 30, the predetermined amount of rotation can be made to cause belt 22 to move the desired half circuit. Movement of the belt by more or less than a half circuit in alternate embodiments may be accomplished with appropriate gearing. As with any spring drive apparatus, the spring tension will eventually diminish to a point where rewinding is necessary but it is seen that a number of successive pictures may be taken by the present apparatus without rewinding. To avoid rewinding at all, any other convenient drive mechanism, as for example a motor or solenoid may be employed which will cause the desired movement of the belt. The drive apparatus employed forms no part of the present invention and has not been shown in the drawings for purposes of simplicity.

In FIGURE 1, the film 15 is shown lying at right angles to the belt 22 so that the sweep across the film 15 is across its width. It should be obvious to anyone skilled in the art the film 15 could be mounted so as to lie parallel with belt 22 thereby causing the sweep to traverse the film longitudinally.

Figure 2:
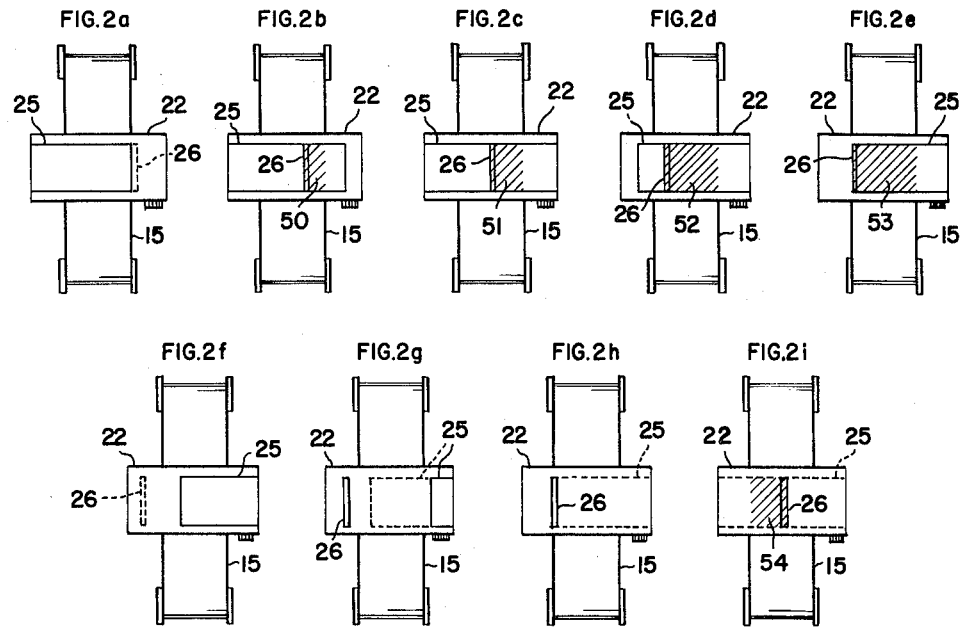
FIGURE 2 is a series of representations of the present invention in use showing how the entire film may be exposed each transit.

FIGURE 2 shows a series of top views of FIGURE 1 to illustrate how the movement of belt 22 causes exposure of the film 15. In FIGURE 2a, the belt 22 is shown with the aperture 25 lying on top for the most part. Aperture 26 lies underneath and as in FIGURE 2a, just below the far right edge of aperture 25. It is seen that there is no light traveling down through belt 22 onto film 15 in FIGURE 2a since the apertures 25 and 26 are not one above the other. Assume that upon pressing the lever to take a picture, the upper portion of belt 22 travels to the right in FIGURE 2a and the lower portion of the belt 22 moves towards the left. Aperture 25 will move towards the right and aperture 26 towards the left so that they will begin passing one another as shown in FIGURE 2b. FIGURE 2b shows the far right side of aperture 25 to have moved towards the right a predetermined amount while the aperture 26 has moved towards the left the same amount. By the time the apparatus has swept from the starting position in FIGURE 2a to the position in FIGURE 2b, film 15 has ben exposed over the area shown by the shaded portion 50. In FIGURE 2c, the aperture 26 has swept further to the left while the far right portion of aperture 25 has swept the same amount to the right and at this time substantially half of film 15 shown by the shaded portion 51 has been exposed. In FIGURE 2d, the aperture 26 has moved yet further to the left and the far left end of aperture 25 has now come into view. At this time approximately three-quarters of the film 15 has been exposed as shown by the shaded portion 52. In FIGURE 2e, the aperture 26 has moved entirely across film 15 so as to expose the entire film as shown by shaded portion 53. Aperture 26 at this time meets the far left end of aperture 25 and any further motion of aperture 26 to the left or motion of aperture 25 to the right will prevent any light from traveling to film 15. As shown in FIGURE 2f, the aperture 25 has continued to move towards the right and it is seen that no light can arrive on film 15 from above. The motion of aperture 26 to the left end of aperture 25 to the right continues until aperture 26 turns the corner and appears on top as in FIGURE 2g. At this time aperture 25 lies on the lower portion on the belt and is shown by dash line 25. Since apertures 25 and 26 are not yet beginning to pass one another no light yet can arrive on film 15. In FIGURE 2h, the belt has moved substantially one-half circuit and now aperture 26 lying on the top portion of the belt is just beginning to lie above the far left portion of aperture 25 which is on the lower portion of the belt. Any further motion of belt 22 will cause the beginning of another picture to be taken. Film 15 may be moved to a different position so that upon a second actuation of belt 22 a second picture will be taken on film 15. To take the process one step further, FIGURE 2i is shown wherein a second picture is in the process of being taken. Aperture 26 lying on the upper portion of the belt has moved to the right whereas aperture 25 lying on the lower portion of the belt has moved to the left and the shaded portion 54 indicates that approximately one-half of a second picture has now been taken. Aperture 26 will continue to the right and aperture 25 will continue to move to the left from FIGURE 2i until the entire picture has been taken. After the picture has been completed and the apertures no longer coincide the mechanism may stop any where before commencement of the next picture. In order to overcome the varying of exposure time during the initial starting acceleration of the belt, it is preferable to stop the mechanism with the aperture 26 at least a short distance away from the closest edge of aperture 25. By doing this, belt 22 will have obtained a certain speed before the apertures begin to coincide and a larger increase in illumination which would occur upon starting, may be avoided.

Figure 3:
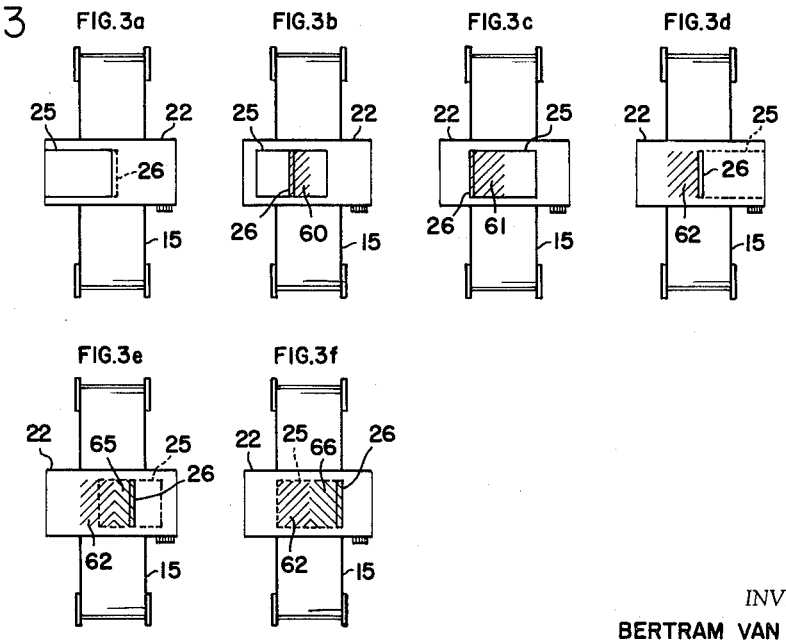
FIGURE 3 is a series of representations of the present invention in use showing how only a portion of the film may be exposed during each transit.

The showing in FIGURE 2 describes how the entire width of film 15 may be exposed during one-half circuit of belt 22. In FIGURE 3, a similar series of representations shows how the film may be exposed a half width at a time and this figure will now be described. In FIGURE 3a, aperture 26 is again shown on the underneath portion of belt 22 and lies just to the right of the far right hand edge of aperture 25. Aperture 25 in FIGURE 3 has been made approximately half the size it was in FIGURE 2. In the initial starting position, aperture 26 and the right hand edge of aperture 25 lie at about the middle of film 15. As before, when a picture is to be taken, the top portion of belt 22 will move to the right and the lower portion will move to the left. In FIGURE 3b, aperture 26 has moved a certain amount to the left while aperture 25 has moved an equal amount to the right so that film 15 is partly exposed as shown by the shaded area 60. In FIGURE 3c, aperture 26 has moved to the left to a position where it meets the far left hand edge of aperture 25 and film 15 has been exposed over the shaded area 61 which is substantially half the width of the film. Aperture 26 will continue to move to the left and aperture 25 will continue to move to the right as it did with regard to FIGURE 2 until aperture 26 turns the corner and begins moving on the top portion of the belt while aperture 25 turns the corner and begins moving along the bottom portion of the belt. In FIGURE 3d, aperture 26 has turned the corner and moved to a position where it just meets the far left end of aperture 25 which now lies underneath aperture 26 and no light is reaching film 15. The shaded portion 62 indicates that the left hand side of film 15 has been exposed during the previous transit. When the next picture is to be taken, aperture 26 will again start moving towards the right along the upper portion of belt 22 while aperture 25 will move towards the left as seen in FIGURE 3e. In addition to the portion 62 which was exposed on the previous picture, the right hand portion of the film is beginning to be exposed as shown in the shaded area 65. Aperture 26 will continue to move towards the right until it meets the far right hand portion of aperture 25 as shown in FIGURE 3f. From this point on, further motion of aperture 26 to the right or of aperture 25 to the left will block light to film 15. It is seen that film 15 has two exposures thereon which are shown by the shaded portions 62 and 66 in FIGURE 3f. Aperture 26 will continue to move along the top portion of belt 22 to the right until it again encounters the position at or shortly before that shown in FIGURE 3a. At this time, film 15 may be advanced so that upon further transits of of apertures 25 and 26 further double pictures may be obtained. As can be seen from FIGURE 3 the center of the large aperture 25 and the small aperture 26 are not equally spaced from each other around the belt as was the case in FIGURE 2 but rather are spaced so that these centers cross at the center of each exposure area. More specifically, in order to obtain the two exposures on film 15 as in FIGURE 3 the space is seen to be substantially one-half of the length of belt 22 plus or minus the distance between the centers of the exposures 62 and 622 of FIGURE 3f depending on which direction the measurement is made. It is also seen from FIGURES 1, 2, and 3 that the belt 15 extends an equal amount on both sides of the center of film 15, or more pertinently, an equal amount on both sides of the center of the exposure 53 of FIGURE 2e or midway between the two exposures 60 and 62 of FIGURE 3f.

If desired, two apertures such as 25 and 26 could be placed on the belt but extending only about half of the width of the belt. A second pair of apertures utilizing the other half width of the belt and spaced about 90° from the first two apertures could then be used. With such an arrangement four separate exposures could be made without moving the film. Many other alternate arrangements for special purposes can be devised utilizing the present invention and while the preferred form of the focal plane shutter has been shown and described herein, it is not to be inferred that this embodiment in intended to be limiting. I intend only to be limited by the following claims.

I claim:
1. Apparatus for use with a camera having a lens system and a film upon which exposures of first and second dimensions are desired comprising, in combination:
   an endless belt of opaque material having a first light transmitting portion with a first dimension substantially equal to the desired first dimension of the exposure and with a second dimension substantially twice the desired second dimension of the exposure, having a second light transmitting portion with a first dimension at least as great as the desired first dimension of the exposure and with a second dimension of predetermined amount, said first and second light transmitting portions being substantially oppositely placed upon said belt;
   first roller means mounting said belt for motion along its length;
   second roller means bearing on said belt to bring opposite sides of said belt closely adjacent one another throughout a predetermined portion of the length of said belt;
   means mounting said first roller means and said second roller means in said camera so that said belt lies between the lens system and the film with the predetermined portion of the length of said belt adjacent the film; and
   drive means connected to said first roller means to cause said belt to move along its length an amount sufficient to cause said first light transmitting portion to pass said second light transmitting portion within the predetermined portion of the length of said belt each half cycle so that light from the lens system passes through said first light transmitting portion and said second light transmitting portion to expose the film.

2. A focal plane shutter for defining first and second exposure areas each having a first width and a first breadth on a film without moving the film comprising:
   an endless opaque belt having first and second transparent openings, the first opening having substantially the first breadth and a width substantially twice the first width, the second opening having substantially the first breadth and a width relatively small with respect to the first width for controlling the exposure time, the distance between the center of the first opening and the center of the second opening as measured around said belt in one direction being substantially equal to one-half of the length of said belt less the distance between the centers of the desired exposure area;
   a film having an area lying in a first plane and upon which the first and second exposure areas are to be defined;
   means mounting said belt near said film so that two substantially opopsite portions of said belt to be adjacent each other and in planes substantially parallel with the first plane, a plane perpendicular to the first plane and including a line midway between the first and second exposure areas dividing said belt in two substantially equal portions; and
   means moving said belt in a circuitous path along its length, the transits of the first and the second openings during each half cycle of motion of said belt allowing alternate exposures of the first and second exposure areas.

3. Focal plane shutter apparatus for use with a film upon which first and second exposure areas are desired within a single film frame comprising:
   an opaque belt formed as an endless loop, said belt having longitudinally spaced first and second transparent apertures, the distance between the centers of the first and second apertures as measured around the belt in one direction being substantially equal to one-half the length of said belt less the distance between the centers of the desired exposure areas; and
   means mounting said belt near the film so that a plane perpendicular to the film frame and half way between the centers of the desired exposure areas divides said belt substantially in halves.

References Cited by the Examiner
UNITED STATES PATENTS 1,003,536   9/1911   Spinks _____ 95—57
2,931,284   4/1960   Vinten _____ 95—57

JOHN M. HORAN, *Primary Examiner.*
NORTON ANSHER, *Examiner.*